(12) United States Patent
Bomberger et al.

(10) Patent No.: US 7,601,659 B2
(45) Date of Patent: Oct. 13, 2009

(54) DEWATERING FABRICS

(75) Inventors: John D. Bomberger, Chadds Ford, PA (US); Karsten Keller, Hockessin, DE (US); Glen E. Simmonds, Avondale, PA (US); Benjamin Fuchs, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 117 days.

(21) Appl. No.: 11/330,461

(22) Filed: Jan. 11, 2006

(65) Prior Publication Data
US 2006/0258246 A1    Nov. 16, 2006

Related U.S. Application Data

(60) Provisional application No. 60/667,466, filed on Apr. 1, 2005.

(51) Int. Cl.
*B32B 5/26* (2006.01)
*B32B 5/32* (2006.01)

(52) U.S. Cl. .................. 442/381; 442/268; 442/363; 442/382; 442/392; 442/401

(58) Field of Classification Search .......... 442/268, 442/381, 392, 363, 382, 401
See application file for complete search history.

(56) References Cited

U.S. PATENT DOCUMENTS

| | | | |
|---|---|---|---|
| 3,700,545 A | 10/1972 | Matsui et al. | |
| 4,043,331 A | 8/1977 | Martin et al. | |
| 4,127,696 A | 11/1978 | Okamoto | |
| 4,449,992 A * | 5/1984 | Yamada et al. | 96/7 |
| 5,204,171 A | 4/1993 | Eschmann | |
| 5,232,768 A * | 8/1993 | Eklund et al. | 442/225 |
| 6,330,883 B1 * | 12/2001 | Berger | 128/201.13 |
| 6,514,386 B2 * | 2/2003 | Watanabe | 162/358.2 |
| 6,861,142 B1 | 3/2005 | Wilkie et al. | |
| 2005/0167061 A1* | 8/2005 | Scherb et al. | 162/115 |

FOREIGN PATENT DOCUMENTS

| | | |
|---|---|---|
| WO | WO 96/16305 A1 | 5/1996 |
| WO | WO 03/080905 A1 | 10/2003 |

* cited by examiner

*Primary Examiner*—Andrew T Piziali
(74) *Attorney, Agent, or Firm*—Gail D. Tanzer

(57) ABSTRACT

The present invention relates to fabrics that can be used in the manufacture of paper. The fabrics preferably have at least three regions of fabric with specified distributions of pore sizes. The fabrics disclosed herein are an effective alternative to conventional dewatering fabrics for removing water from the incipient paper, which can provide energy cost savings in subsequent elevated temperature drying steps.

15 Claims, 4 Drawing Sheets

DEWATERING FABRICS

FIELD OF THE INVENTION

The present invention relates to fabrics that can be used in the manufacture of paper. The fabrics have at least three regions with specified distributions of pore sizes.

TECHNICAL BACKGROUND

In paper manufacturing processes, cellulose fibers are deposited as an aqueous slurry on a screen. The water is removed to form the paper. Frequently, a dewatering fabric is used in a second stage of water removal from the aqueous slurry.

Eschmann (U.S. Pat. No. 5,204,171) describes a papermaking fabric comprising a blocking layer.

Chuang et al (WO9616305) describes a capillary dewatering method and apparatus.

New fabrics for dewatering during the papermaking process are desired because improved efficiency in water removal can provide cost savings by reducing or eliminating the need for subsequent elevated temperature drying steps. The present invention is directed to these and other important ends.

SUMMARY OF THE INVENTION

One aspect of the present invention is a fabric structure comprising at least three regions, said three regions comprising:
a) a first, surface region;
b) a second region of material having a mean hydraulic pore diameter of 1 to 10 microns; and
c) a third region of material, having a mean hydraulic pore diameter of 10 microns or less.

DETAILED DESCRIPTION

The present invention provides fabrics that are useful in dewatering during paper making processes. In contrast to known papermaking fabrics, a fabric according to the present invention comprises a flow resistance region and a capillary region.

In use, dewatering fabrics are pressed against a web of paper fibers. The paper fibers are deposited on a screen in an aqueous suspension and the web retains much water. Pressing a dewatering fabric of the present invention against the wet web effectively removes as much as 10% more water from the web than a fabric of typical construction. Drying to remove additional water may still be required, but the drying time and temperature, and hence the associated energy costs, are greatly reduced since a larger amount of water has been removed by the dewatering fabric of the present invention.

A fabric according to the present invention comprises at least three regions. The regions can be, for example, nonwoven material made from synthetic polymer staple or continuous filaments. As will be understood by one skilled in the art, fibers, as used herein, are filaments that have been cut or chopped into discrete lengths, whereas-filaments are substantially continuous. A surface region, which is disposed toward the incipient paper to be dewatered, can be made from similar nonwoven or membrane material. Other nonwoven regions can be attached to a woven layer for strength and stability.

Figure 1:
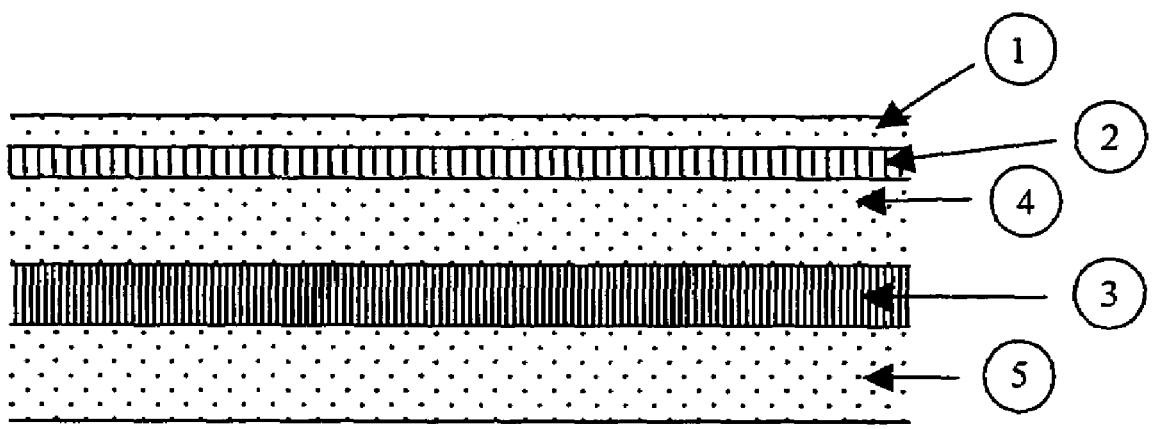
FIG. 1 shows a cross section of a fabric according to an embodiment of the present invention.

One embodiment of a fabric according to the present invention is shown in FIG. 1. FIG. 1 shows a cross-section of the fabric. The first, surface region, region 1 can comprise coarse staple fibers. The surface region allows water to penetrate the fabric with little resistance to flow. The surface region is sufficiently thick to provide mechanical protection of the underlying regions during press operations and yet allow the underlying region to work effectively as a flow control region during separation of the paper from the fabric. The next, underlying, region 2 can be a porous nonwoven or membrane material with a mean hydraulic pore diameter of 1 to 10 microns. If a nonwoven material is used for the second region of the fabric, 2, it can comprise staple fibers or continuous filaments.

The second region, region 2 is a flow control region and is preferably no more than 100 microns thick in order to prevent undue resistance to dewatering while the fabric and the paper are in the press nip. Region 2 is designed to act as a flow control region to prevent rewetting of the paper when the paper is separated from the fabric after pressing. It also provides improved pressure uniformity compared to a region with a coarser pore structure. Improved pressure uniformity enhances the rate of dewatering while the fabric and paper are in the press nip. This region has a porosity of about 50% or greater.

The nonwoven material of region 2 can be made using an electrospinning technique as disclosed in U.S. Pat. No. 4,043,331, or a nonwoven material made by an electroblowing technique as disclosed in WO 2003/080905. Alternatively, the material of region 2 can be a nonwoven material made by using islands-in-the-sea technology as disclosed, for example, in U.S. Pat. Nos. 3,700,545, 4,127,696 and 6,861,142. If islands-in-the-sea technology is used, the sea polymer is preferably of a type that can be dissolved, thereby leaving only the fine island filaments. An example of a dissolvable sea polymer is a linear polyester that is dissolvable in water or sodium hydroxide solution. Once the sea polymer is dissolved, the region is comprised of only the fine island filaments. These filaments preferably have diameters within the range of 0.1 to 5 microns to achieve the desired mean hydraulic pore diameter and overall porosity. Smaller filaments result in finer pores. If filaments of non-round cross-section are used, the term "diameter" refers to the smallest cross-sectional dimension of the filaments. Alternate means for manufacturing nonwoven materials of fine filaments or staple fibers include the spinning of splittable filaments, wet lay and air lay techniques which are all well established and known to those skilled in the art of nonwovens manufacture. Typical materials of construction for region 2 include polyamide, polyester, polypropylene, polyethylene, polylactic acid, polytrimethylene terephthalate polyesteramide and any other melt spinnable polymer, including bicomponent polymers. Polyamides are preferred.

The third region of the fabric, 3, can comprise staple fibers or continuous filaments, but the filaments are preferably of a finer denier than those in region 1. Region 3 can be made using the same methods as used to make region 2. The mean hydraulic pore diameter of the material in region 3 is less than 10 microns and is also less than the mean hydraulic pore diameter of the paper web being dewatered. Region 3 is a capillary region. Capillary forces in region 3 can prevent water in the fabric from rewetting the paper web when pressure is released as the paper and fabric exit the press nip.

The location of region 3 is of the most importance of all of the regions in the fabric. It is desirably placed at a position in the fabric so that the front of water that is pressed out of the paper is inside region 3 when pressure is released and when the fabric has expanded after compression in the nip. If the fabric saturates fully during dewatering, region 3 is desirably located at the bottom layer of the fabric. Region 3 is preferably sufficiently thin to provide reduced resistance to flow during dewatering, but thick enough to provide latitude for movement of the front of water moving though the fabric. Region 3 preferably has a porosity of 50% or greater, to reduce resistance to flow.

Regions 4 and 5 in FIG. 1 comprise coarse filaments. The coarse filaments can be any filaments having a denier per filament of 1.0 or greater. Alternatively, regions 4 and/or 5 can be made of a nonwoven material of a structure familiar to practitioners of the art of press fabric manufacture, such as, for example, a carded web of coarse staple fibers. The mean hydraulic pore diameters of Regions 4 and 5 are preferably an order of magnitude larger than those of region 2 or 3. Regions 4 and 5 allow water to penetrate the fabric with little resistance to flow and act as reservoirs for the water pressed from the paper.

In the processes disclosed herein, the use of both a flow control region and a capillary region in the dewatering fabric increases the amount of water removed from the wet paper during the pressing process compared to a fabric with neither a flow control region or a capillary region, or compared to a fabric with only a flow control region. The two functional regions of the fabric work together to improve dewatering by acting against the flow of water from the fabric back into the paper at different times in the press process, and using different physical mechanisms.

The press process for dewatering paper includes three consecutive phases, each acting on a portion of the fabric at different times in sequence: the dewatering phase, when pressure on the paper and fabric is increasing as the material travels through the nip; the rewetting phase, as the paper and fabric expand after the press nip while the paper and fabric remain in contact; and the separation phase, when the paper is separated from the fabric. It is common practice to make the rewetting phase as short as possible by quickly removing the paper from the fabric. Nonetheless, there is always some time in which the paper and fabric are in contact before they can be separated. Total contact time between the paper and the fabric in a typical press nip is typically less than about 2 seconds.

The capillary region uses capillary forces to prevent rewetting of the paper when pressure is removed from the fabric and paper as they exit the press nip. Because of this, the capillary region has a mean hydraulic pore size smaller than the mean hydraulic pore size of the wet paper web. Such small pores can strongly inhibit water flow into the fabric during the dewatering phase of the press process, so a high number of pores are desirable. Consequently, the porosity of the capillary region is preferably greater than 50%. The placement of the capillary region with respect to the surfaces of the fabric is chosen to preventing rewet of the paper. It is desirably placed at a position in the fabric so that the front of water that is pressed out of the paper is inside the capillary region when pressure is released and when the fabric has expanded after compression in the nip. If the fabric saturates fully during dewatering, the capillary region is desirably located at the bottom of the fabric.

The flow control region works primarily to inhibit flow from the fabric into the paper when the paper and fabric are separated. When the paper and fabric are separated, a partial vacuum is formed between the paper and the fabric. This vacuum draws water from the fabric. The water pulled to the region between the paper and fabric can be easily absorbed by the paper. The flow control region, because of its relatively small pore diameters compared to the bulk of the fabric not including the capillary region, causes an increase in shear forces acting on the water, which counters the pressure gradient caused by the partial vacuum. Unlike the capillary layer, however, the pore diameters required are not so small as to sufficiently inhibit the flow of water during the dewatering regime.

Figure 2:
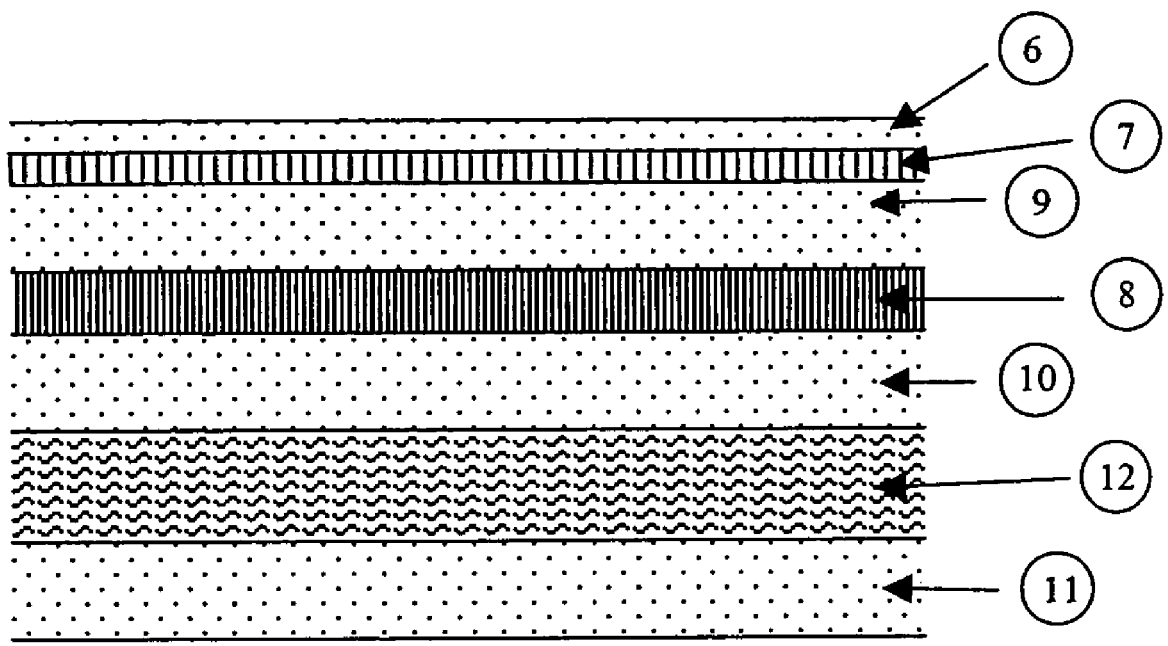
FIG. 2 shows a cross section of a fabric according to a second embodiment of the present invention.

A second embodiment of a fabric of the present invention is shown in cross section in FIG. 2. Regions 9, 10, and 11 are made of coarse filaments, i.e., filaments having a denier of 1.0 or greater. One or more of regions 9, 10, or 11 can alternatively be made of nonwoven material of a structure familiar to practitioners of the art of press fabric manufacture, such as a carded web of coarse staple fibers. Regions 6, 7, and 8 correspond to regions 1, 2, and 3 in the first embodiment of the invention as shown in FIG. 1. Region 7 is the flow control region and region 8 is the capillary region. Regions 9, 10, and 11 are of similar structure and purpose to regions 4 and 5 in the first embodiment Only the thicknesses of regions 9, 10 and 11 are different from those of regions 4 and 5 so as to assure the proper placement of the capillary region 8. Otherwise, the structures are the same. The mean hydraulic pore diameter for regions 9, 10, and 11 is an order of magnitude larger than for the flow control or capillary regions. Regions 9, 10, and 11 allow water to penetrate the fabric with little resistance to flow and act as reservoirs for the water pressed from the paper. The thickness of these regions is such that region 8 is positioned in relation to the surfaces of the fabric in order that region 8 can act effectively as a capillary region, as described previously. Region 12 is an optional woven layer that can be included to add strength and stability to the fabric.

Figure 3:
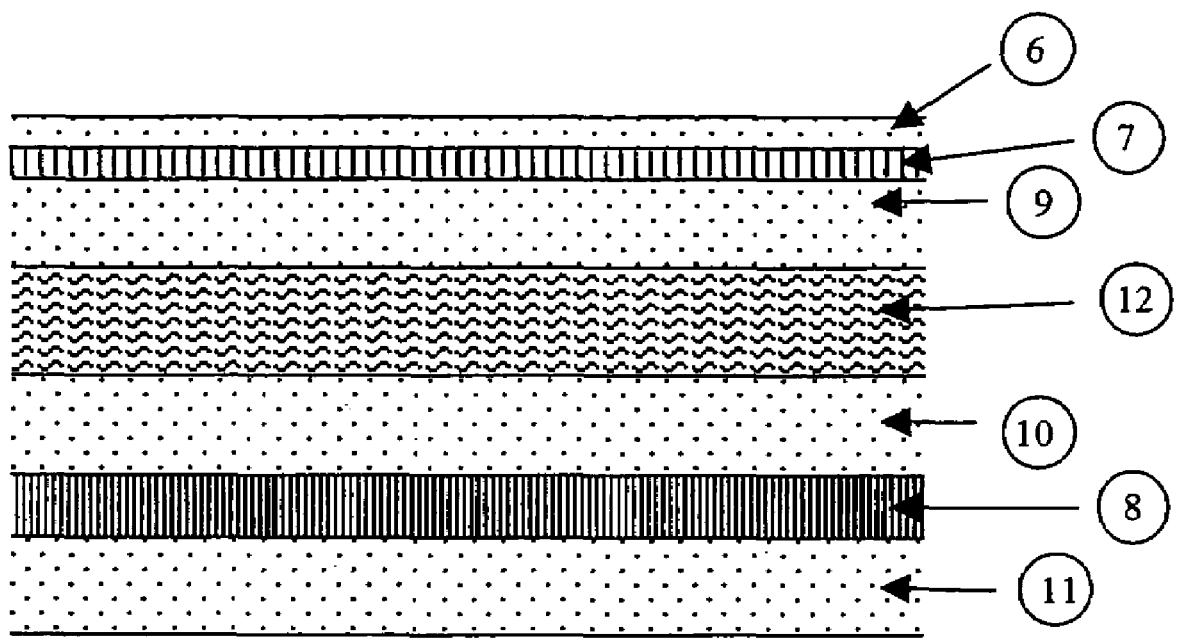
FIG. 3 shows a cross section of a fabric according to a third embodiment of the present invention

A third embodiment of a fabric of the present invention is shown in cross section in FIG. 3. In the embodiment of FIG. 2, the capillary region 8 is located above woven layer (region 12). In the embodiment of FIG. 3, the capillary region 8 is located below the woven layer (region 12). The inclusion of any of regions 9, 10 and 11 are optional in the second or third embodiments.

In some embodiments, the fabrics are in the form of a felt.

Figure 4:
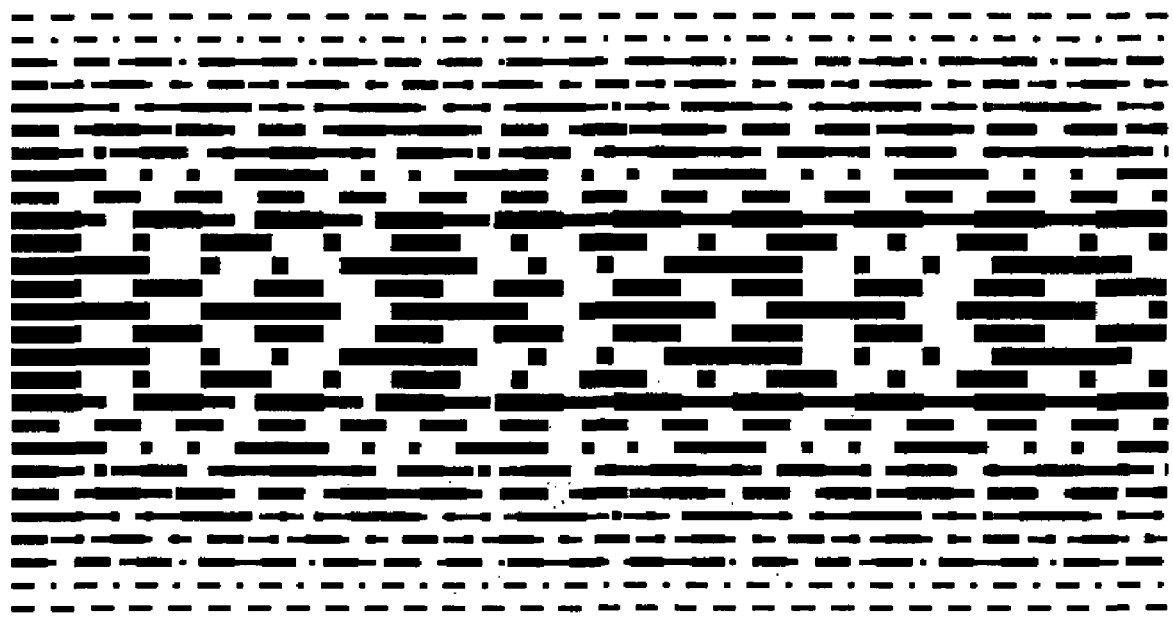
FIG. 4 shows a cross section of fabric with continuously varying pore size throughout the thickness of the fabric.

In the embodiments disclosed herein, each region of the fabric can be a separate layer, or can be a portion of a thicker material in which the thickness is divided into portions having differing pore structures (FIGS. 1, 2, and 3) or a continuously varying pore structure as shown in FIG. 4.

As shown in FIG. 4, one or more layers of the multi-layer fabric, or the entire fabric, can be constructed such the mean hydraulic pore diameter and porosity vary continuously from the one surface of the material to the other. This can be accomplished by laying down individual layers of filament or different deniers during the construction of a nonwoven. It can also be accomplished by blending various density or denier fibers and then using dry lay or wet lay techniques that encourage stratification of the fiber types throughout the thickness of the material but with no distinct boundaries between the fiber types. It can also be accomplished by a multiple step coating technique wherein each subsequent coating incrementally changes the pore structure with no distinct boundary between each coating.

Other techniques familiar to those skilled in the art of nonwovens manufacturing, such as calendering, can be applied to cause a variation in the pore size from one surface to the other.

Each region of the fabric, independently, can be made from natural or synthetic materials. Examples of natural materials that can be used are wool, cotton, silica, etc. and may be in the form of fibers, particles, or coatings. Examples of synthetic materials are polyamide, polyester, and polypropylene. The synthetic materials can be in the form of staple fibers, continuous filaments, particles, films or coatings. The desired pore structures of each region can be created using known non-woven or coatings techniques. Examples of suitable non-woven techniques include wet laying, air laying, melt-spinning, spunbonding, spunlacing, melt-blowing, electrospinning, electroblowing, carding, cross-lapping, needlepunching, calendering, laminating, adhesive bonding, thermal bonding, and stitch-bonding. Examples of suitable coatings techniques include sputtering, spraying, plating and dipping. In some embodiments, the regions can be manufactured or purchased as commercially available separate layers and then assembled using one or more of the above-recited techniques.

For example, the fabric can be constructed by stacking the individual layers as follows:

Flow control layer, 2 on the bottom followed by a batt of coarse staple fibers 4, then the capillary layer 3, and finally another batt of coarse staple fibers, 5. This stacked assembly is needled such that the needles penetrate through layer 5 first and layer 2 last. Needling in this manner pushes the coarse fibers from regions 4 and 5 through the flow control region 2 creating the surface region, 1 during the needling operation. At the completion of needling, the assembled structure is hot calendered on the surface region, 1 to smooth and stabilize the surface and close any large holes caused by the needle penetrations. The fabric is then inverted for use such that the surface region 1, faces the cellulose fiber paper structure in the press machine.

The dewatering fabrics disclosed herein can also be used for other applications that involve the absorption of liquids from solids. Such applications include diapers, drying cloths, fabrics for centrifuges, and solid/liquid separation of fine minerals.

EXAMPLES

The following examples were simulated using a computational model of the flow of water in a paper web and press fabric system as the paper web and fabric pass through a press nip. The model dynamically computes the position of water in the web/fabric system using a macroscopic mechanical energy balance. Given inputs describing the press process, the paper web and fabric construction, and the composition of the paper web and fabric prior to pressing, the model predicts the percent solids in the paper after pressing. From the computational model, it is possible to deduce the effect of alternate fabric constructions on dewatering behavior.

Example 1

This example illustrates the effectiveness of a dewatering fabric of the present invention as compared with a fabric containing only a flow resistance layer and a fabric made only of coarse fiber batt.

A 75 g/m² paper with a pre-press composition of 25% cellulose solids is dewatered using a press with a peak load of 70 atm and a 3 ms dwell time in the nip. The press fabric configuration is as in FIG. 1, with an overall fabric thickness of 2.0 mm. The flow control region 2 is located 0.3 mm from the paper-side surface and is 0.1 mm thick, with a mean hydraulic pore diameter of 5 μm and a porosity of 50%. The capillary region 3 is located 1.2 mm from the paper-side surface of the fabric, and is 0.5 mm thick with a mean hydraulic pore diameter of 0.5 μm and a porosity of 75%. The remainder of the press fabric is constructed of coarse fiber batt with a porosity of 50%. These parameters and values are inputs to the computational model. The model predicts that, under these conditions, the fabric with both a capillary region and a flow control region has 54.8% post-press solids. A press fabric with only a flow control region has post-press solids of 51.3%, and a press fabric made only of coarse fiber batt has 48% post press solids. Using a capillary region and a flow control region improves the dewatering by 3.5% solids compared to using a flow control region only, and by 6.8% solids compared to using a plain coarse fiber batt.

Example 2

This example illustrates the effectiveness of the dewatering fabric of the present invention as compared with a fabric containing only a flow resistance layer or a fabric made only of coarse fiber batt.

A 200 g/m paper with a pre-press composition of 25% cellulose solids is dewatered using a press with a peak load of 70 atm and a 3 ms dwell time in the nip. The press fabric configuration is as in FIG. 1, with an overall fabric thickness of 2.0 mm. The flow control region 2 is located 0.3 mm from the paper-side surface and is 0.1 mm thick, with a mean hydraulic pore diameter of 5 μm and a porosity of 50%. The capillary region 3 is located 1.3 mm from the paper-side surface of the fabric, and is 0.5 mm thick with a mean hydraulic pore diameter of 0.5 μm and a porosity of 75%. The remainder of the press fabric is constructed of coarse fiber batt with a porosity of 50%. Under these conditions, the fabric with both a capillary region and a flow control region has 32.3% post-press solids. A press fabric with only a flow control region has post-press solids of 30.6%, and a press fabric made only of coarse fiber batt has 30.4% post press solids. Using a capillary region and a flow control region improves the dewatering by 1.7% solids compared to using a flow control region only, and by 1.9% solids compared to using a plain coarse fiber batt.

Example 3

This example illustrates the effectiveness of two experimental materials used as flow control layer and capillary layer.

A 75 g/m² paper with a pre-press composition of 25% cellulose solids is dewatered using a press with a peak load of 70 atm and a 3 ms dwell time in the nip. The press fabric configuration is as in FIG. 1, with an overall fabric thickness of 2.0 mm. The flow control region 2 is located 0.3 mm from the paper-side surface and is 0.1 mm thick. It is made from an islands in sea polyamide nonwoven. To form the flow control layer, a nonwoven batt of islands in the sea fibers was manufactured using standard bicomponent melt spinning technology. The fiber structure consisted of 18 islands using DuPont Zytel101 nylon 6,6 as the island polymer and Eastman AQ55S linear polyester as the sea polymer. Polymer ratio was 75% nylon and 25% polyester. Total fiber denier was 3.0 and total fabric basis weight was 84 gm/sq meter. The batt was then cold calendered to provide sufficient mechanical integrity to permit handling. The polyester in the fabric was then removed by flushing with a hot water solution at 95C for 30 minutes. The resulting nonwoven batt consisted of nylon fibers that were an average of 3.9 microns in diameter. The flow control layer has a pore distribution with a hydraulic pore diameter of 4.8 µm, a minimum hydraulic pore diameter of 1.2 µm, and a maximum hydraulic pore diameter of 19.7 µm, and a porosity of 50%. The capillary region 3 is located 1.2 mm from the paper-side surface of the fabric, and is 0.5 mm thick. The capillary layer was formed from nonwoven batt of nylon filaments manufactured using electroblown technology with 1 micron diameter filaments at a fabric basis weight of 30.4 gm/sq meter. The electroblown polyamide nonwoven has a hydraulic pore diameter of 3.0 µm, a minimum hydraulic pore diameter of 0.7 µm, and a maximum hydraulic pore diameter of 11.8 µm, and a porosity of 70%. The remainder of the press fabric is constructed of coarse fiber batt with a porosity of 50%. These parameters and values are inputs to the computational model. The model predicts that, under these conditions and using a fabric constructed as indicated, the paper pressed with a fabric with both a capillary region and a flow control region has 63.6% post-press solids while a paper pressed with a press fabric made only of coarse fiber batt has 35.9% post-press solids.

What is claimed is:

1. A multi-layer fabric structure comprising at least five layers, said layers comprising:
   a) a first, surface layer comprising coarse staple fibers;
   b) a second layer of nonwoven fabric having a mean hydraulic pore diameter of 1 to 10 micron, a thickness of 100 microns or less and a porosity of about 50% or greater, said second layer comprising filaments having diameters within the range of 0.1 to 5 microns;
   c) a third layer of fabric, having a mean hydraulic pore diameter of less than 10 microns and a porosity of 50% or greater;
   d) a fourth layer disposed between the second layer and the third layer, the fourth layer comprising coarse filaments or staple fibers, and having a mean hydraulic pore diameter an order of magnitude greater than the mean hydraulic pore diameter of the second layer and the third layer; and
   e) a fifth layer contacting the third layer, the fifth layer comprising coarse filaments or staple fibers, and having a mean hydraulic pore diameter an order of magnitude greater than the mean hydraulic pore diameter of the second layer and the third layer.

2. The multi-layer fabric of claim 1, wherein the third region comprises fibers or filaments that are less than or equal to 5 microns in diameter.

3. The multi-region fabric of claim 1 wherein the second region is an electrospun fiber or filament material.

4. The multi-layer fabric of claim 1, wherein the second region is an electroblown fiber or filament material.

5. The multi-region fabric of claim 1 wherein the second region is a spunbonded material of islands in the sea filaments or fibers.

6. The multi-layer fabric of claim 1, wherein the third region is an electrospun filament or fiber material.

7. The multi-layer fabric of claim 1, wherein the third region is an electroblown filament or fiber material.

8. The multi-region fabric of claim 1, wherein the third region is a spunbonded material of islands in the sea filaments or fibers.

9. The multi-layer fabric of claim 1, wherein the fiber or filaments are made of a material selected from polyamide, polyester, polypropylene, polyethylene, polylactic acid, polytrimethylene terephthalate, and polyesteramide.

10. The multi-layer fabric of claim 2 wherein the fiber or filaments are made of a material selected from a group consisting of polyamide, polyester, polyethylene, and polypropylene.

11. The multi-region fabric of claim 3 wherein the electrospun filament or fiber material is selected from polyamide, polyester, polyethylene and polypropylene.

12. The multi-layer fabric of claim 4 wherein the electroblown filament or fiber material is selected from polyamide, polyester, polyethylene, and polypropylene.

13. The multi-region fabric of claims 5 wherein the spunbonded islands in the sea filament or fiber material is selected from polyamide, polyester, polyethylene, and polypropylene.

14. The multi-region fabric of claim 6 wherein the electrospun filament or fiber material is selected from polyamide, polyester, polyethylene, and polypropylene.

15. The multi-layer fabric of claim 7 wherein the electroblown filament or fiber material is selected from polyamide, polyester, polyethylene and polypropylene.

* * * * *

UNITED STATES PATENT AND TRADEMARK OFFICE
CERTIFICATE OF CORRECTION

| | |
|---|---|
| PATENT NO. | : 7,601,659 B2 |
| APPLICATION NO. | : 11/330461 |
| DATED | : October 13, 2009 |
| INVENTOR(S) | : Bomberger et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Fifth Day of October, 2010

David J. Kappos
*Director of the United States Patent and Trademark Office*